Patented June 29, 1954

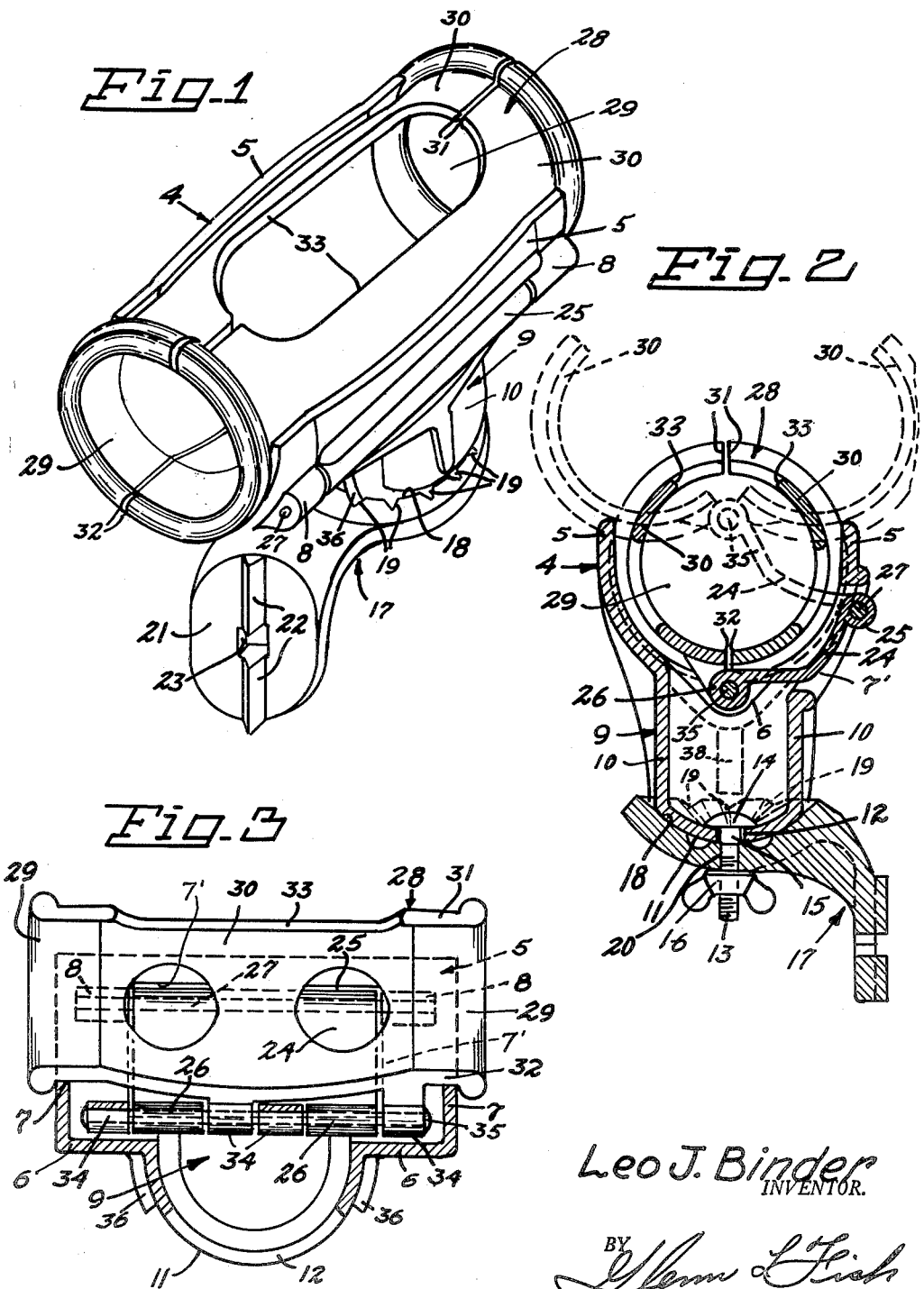

2,682,127

UNITED STATES PATENT OFFICE 2,682,127

FISHING ROD HOLDER

Leo J. Binder, Spokane, Wash.

Application March 3, 1952, Serial No. 274,571

5 Claims. (Cl. 43—21.2)

My present invention is a fishing rod holder.

One object of the invention lies in the provision of a holder which is particularly adapted to be mounted upon a boat in a convenient location and has means for holding a fishing rod securely against removal by any action at the tip end of the pole, but which will release the pole when lifted upwardly at the butt end.

Another object of the invention lies in the provision of a fishing rod holder adapted to releasably secure a fishing rod and which is selectively adjustable to various vertical and horizontal angular positions.

Another object of the invention lies in the provision of a fishing rod holder which has a saddle and a sectional tubular locking shell adapted to rest therein and connected thereto by means of a hinge link which permits its movement into and out of the saddle.

Another object of the invention lies in the provision of a fishing rod holder which is simple in construction and not liable to get out of working condition.

Another object of the invention lies in the provision of a fishing rod holder which is so constructed that it can be manufactured very inexpensively and may be assembled with ease.

These and other objects of the invention will become apparent during the course of the following description.

In the accompanying drawing, forming a part of this specification, and in which like numerals are employed to designate like parts, Figure 1 is a perspective view of my improved fish rod holding device, Figure 2 is a transverse cross section taken through the holder and showing the sectional shell in the securing position in full line and the released position by dotted lines, and, Figure 3 is a longitudinal cross section taken through the fishing rod holder.

Referring now more particularly to the drawing, I have shown the preferred embodiment of my invention as having a substantially semi-circular elongated saddle 4 having open ends and outwardly bulging side walls 5 and bottom wall 6. The bottom wall 6 is provided with vertically disposed supporting seats 7 at the outer ends thereof.

One wall 5 is provided with a rectangular opening 7' defined by the marginal edges of the wall. Longitudinally spaced opposed bosses 8 are formed on the outer faces of the marginal edges of the wall 5 and are disposed at the ends of the opening 7' adjacent the upper edge thereof.

Longitudinally centered and on the bottom wall 6 of the saddle 4, I have provided a depending hollow protuberance 9. When viewed from the side, the protuberance 9 appears to be substantially semi-circular and has vertical flat side faces 10—10 merging into an arcuate shaped bottom face, thus providing a substantially hemispherical bottom face 11.

A longitudinally extending slot 12 is formed in the face 11 of the protuberance and is adapted to receive a carriage bolt 13 with its head 14 disposed within the protuberance and the bolt body extending outwardly through the slot 12 and with the shoulder 15 slidably engaged in the slot. The slot is of such a width that the shoulder 15 may not rotate therein and it is therefore anchored against rotation in the slot 12.

A supporting bracket 17 is provided with a concave socket 18 having radially disposed V-shaped grooves 19 formed therein and a central aperture 20 through which bolt 13 extends and is secured by wing nut 16. A securing face 21 on the bracket has a vertically disposed wedge shaped ridge 22 formed thereon and disposed at right angles to the socket 18. A square opening 23 is provided centric of the face 21 to receive a carriage bolt (not shown) for securing the bracket to a C-clamp or boat gunwale, as desired, to position the fishing rod holder in a convenient location.

When the saddle 4 is disposed at right angles to socket 18, the holder may be swiveled about bolt 13 to any horizontal angle and then the saddle may be tilted vertically to the desired vertical angle with one of the opposed wedge-shaped guides 36 entering a selected V-shaped groove 19 of the socket 18 and the wing nut 16 then tightened to secure the holder and saddle in position.

A transversely angular hinge link 24 is positioned within the saddle 4 and has a longitudinally extending sleeve 25 on its outer marginal edge, and spaced axially aligned marginal sleeves 26 on the opposed edge and at the ends of the link 24. A hinge pin 27 extends through the aligned bores of bosses 8 and shleeve 25 and hingedly connects the link 24 to the saddle 4, thus permitting the inner end of the link to move vertically in said saddle.

A separable tubular shell 28 is formed with a central circumferential bulge conforming to the bulge of saddle 4 and tapers inwardly toward the open ends 29. The shell is formed in two opposed semi-circular sections 30—30 defined by longitudinally extending upper and lower adjoining edges 31 and 32. The upper adjoining edges 31 are each formed with a recess 33 which cooperate to form a fishing reel rest when the shell is in its closed position. The lower edges 32 are provided with depending ears 34 having axially aligned bores adapted to be aligned with the bores of sleeves 26 and a pivot pin 35 is provided therein to hingedly unite the shell sections 30—30 and also pivotally unite the shell 28 to the hinge link 24.

When the shell 28 is in its lowered position, the saddle side walls 5 hold it in the closed position about a fishing rod and the rod's reel extends upwardly out of the reel rest formed by recesses 33. Upward movement of the butt end of the rod lifts the shell 28 from the saddle and permits the shell sections 30—30 to hinge outwardly opening the shell and releasing the rod.

Having thus described my invention, I claim:

1. A fishing rod holder comprising a substantially semi-cylindrical elongated rigid saddle having open ends and outwardly bulging side and bottom walls, said saddle having a rectangular opening formed in one side wall thereof, spaced external bosses on the last mentioned side wall and disposed at the ends of said opening, axially aligned bores in said bosses, an angular hinge link in the saddle and having a marginal sleeve extending longitudinally thereof and disposed between said bosses, a hinge pin extending through said bores and sleeve for pivotally mounting said hinge link in said saddle, spaced axially aligned sleeves on the longitudinal side edge of said hinge link opposed to said sleeve, a pivot pin extending through and beyond said aligned sleeves, an open ended tubular shell adapted to rest in said saddle and substantially conforming to the configuration thereof, said shell comprising opposed semi-cylindrical sections having depending ears at their lower longitudinal marginal edges, aligned bores in the ears, said pivot pin extending through said ears and pivotally uniting said shell to said hinge link, said sections having opposed recesses in their upper longitudinal marginal edges cooperating to form a fishing reel rest when the sections are seated in said saddle, and means secured to said saddle for selective angular adjustments and adapted to support the saddle.

2. A fishing rod holder comprising a substantially semi-cylindrical elongated saddle having open ends and outwardly bulging side and bottom walls, said saddle having a rectangular opening formed in one side wall thereof, spaced external bosses on the last named side wall and disposed at the ends of said opening, axially aligned bores in said bosses, an angular hinge link in the saddle and having a marginal sleeve extending longitudinally thereof and disposed between said bosses, a hinge pin extending through said bores and sleeve for pivotally mounting said hinge link in said saddle, spaced axially aligned sleeves on the longitudinal side edge of said hinge link opposed to said sleeve, a pivot pin extending through and beyond said aligned sleeves, an open ended tubular shell adapted to rest in said saddle and substantially conforming to the configuration thereof, said shell comprising opposed semi-cylindrical sections having depending ears at their lower longitudinal marginal edges, aligned bores in the ears, said pivot pin extending through said ears and pivotally uniting said shell to said hinge link, said sections having opposed recesses in their upper longitudinal marginal edges cooperating to form a fishing reel rest, when the sections are seated in said saddle, and means carried by the saddle and associated with a mounting bracket whereby said holder is selectively adjustable to vertical and horizontal angular positions.

3. A fishing rod holder comprising a substantially semi-cylindrical elongated saddle having open ends and outwardly bulging side and bottom walls and adapted to be supported for movement to selective vertical and horizontal angular positions, companion semi-cylindrical sections adapted to rest in said saddle and constituting a separable tubular shell, said sections being hingedly secured together at their lower adjoining edges, an angular hinge link pivotally secured at one end to said shell sections at their lower adjoining edges, and said hinge link being pivotally secured at its opposed end to the saddle and disposed to permit the shell to be raised from the saddle and separated by pivotal movement at the lower adjoining edges, whereby a fishing rod may be secured in said shell in the saddle and released when lifted upwardly.

4. A fishing rod holder comprising a saddle adapted to be supported for movement to selective vertical and horizontal angular positions, companion semi-cylindrical sections adapted to rest in said saddle and constituting a separable tubular shell, and a hinge link pivotally secured at one end to the saddle and at the other end to said shell and disposed to permit the shell to be raised from the saddle, whereby a fishing rod may be secured in said shell and released when lifted upwardly.

5. A fishing rod holder comprising a saddle, companion semi-cylindrical sections separate from and normally supported by the saddle and shiftable upwardly therefrom, said sections being hingedly joined to each other along their lower meeting edges, and a hinge link pivotally secured to the saddle at one end and to said sections at the other end, whereby said sections are shiftable upwardly out of the saddle and released to open by hinging at their joined edges.

References Cited in the file of this patent

UNITED STATES PATENTS

| Number | Name | Date |
|---|---|---|
| 573,891 | Martin | Dec. 29, 1896 |
| 594,541 | Kilbourn | Nov. 30, 1897 |
| 661,643 | Mowry | Nov. 13, 1900 |
| 684,451 | Mowry | Oct. 15, 1901 |
| 1,278,318 | Edsall | Sept. 10, 1918 |
| 1,761,497 | Smith | June 3, 1930 |
| 2,267,383 | Van Norstrand | Dec. 23, 1941 |
| 2,297,919 | Scott | Oct. 6, 1942 |
| 2,576,212 | Carter | Nov. 27, 1951 |